Dec. 8, 1959 W. W. PHARIS 2,916,556
DIAL TELEPHONE SIGNALING SYSTEM
Filed May 7, 1957 5 Sheets-Sheet 1
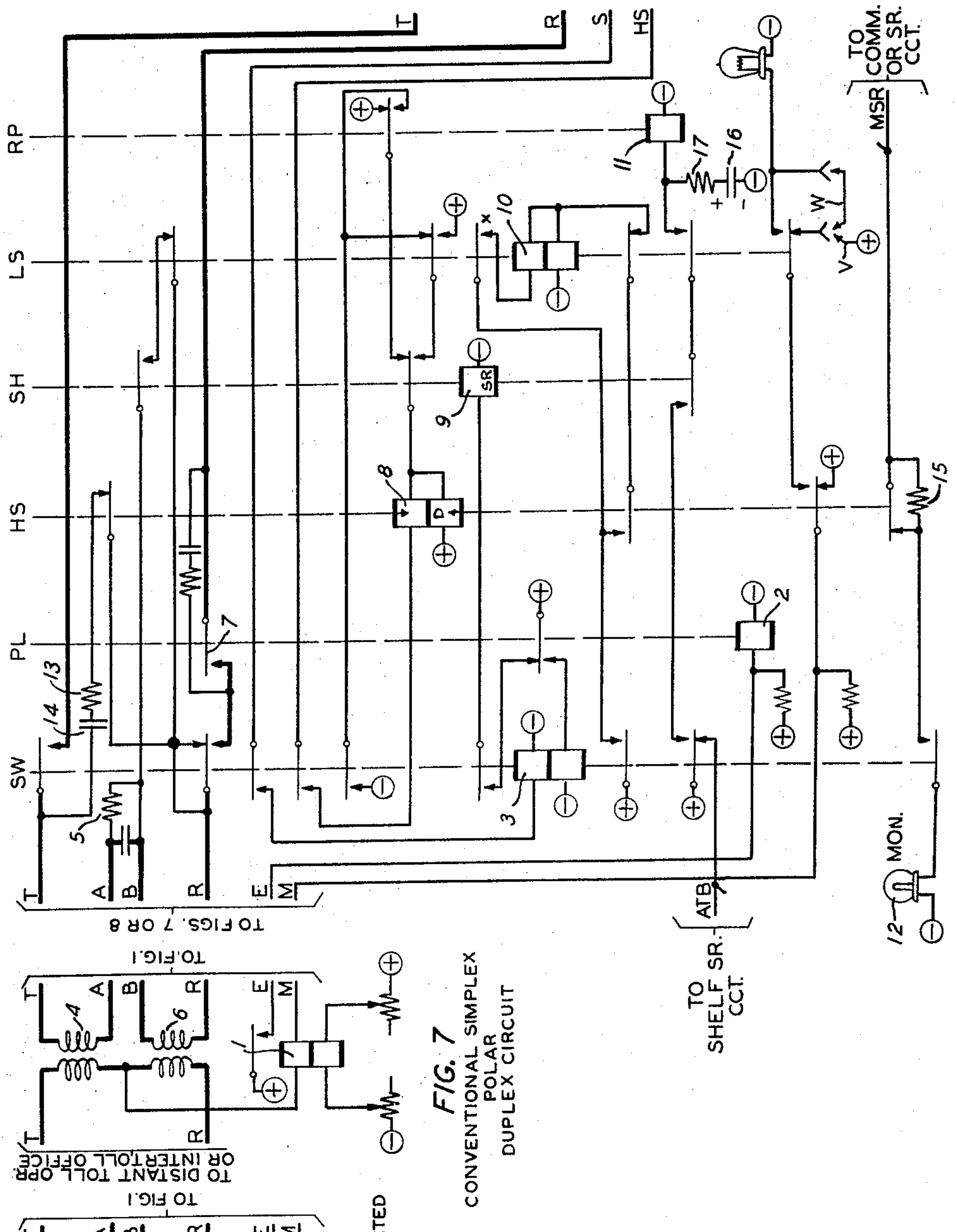
FIG. 1, FIG. 7 CONVENTIONAL SIMPLEX POLAR DUPLEX CIRCUIT
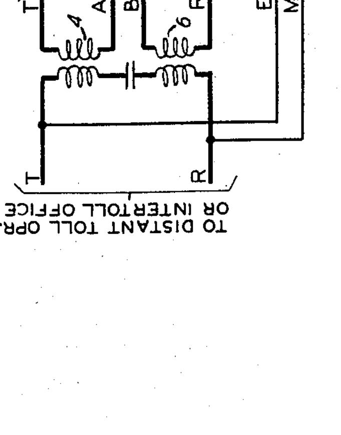
FIG. 8 CONVENTIONAL COMPOSITED CIRCUIT
INVENTOR
W. W. PHARIS
BY
Francis E. Blake
ATTORNEY Dec. 8, 1959 W. W. PHARIS 2,916,556

DIAL TELEPHONE SIGNALING SYSTEM

Filed May 7, 1957 5 Sheets-Sheet 2

United States Patent Office 2,916,556
Patented Dec. 8, 1959

2,916,556

DIAL TELEPHONE SIGNALING SYSTEM

William W. Pharis, Rochester, N.Y., assignor to General Dynamics Corporation, Rochester, N.Y., a corporation of Delaware Application May 7, 1957, Serial No. 657,595

8 Claims. (Cl. 179—18)

This invention relates to signaling systems and particularly to means provided in a dial telephone system for the transmission of supervisory signals.

The object of the invention is to provide means for reporting over a toll connection the distant seizure of a called line whereby the operator will be notified that the proper conidtions have been established for calling the seized station so that she may at any time thereafter apply the ringing signal thereto or alternatively where an automatic circuit, as an intertoll trunk, is used, the ringing signal may be triggered to be automatically applied.

The invention is embodied in a one way trunk circuit from a distant toll or intertoll point and terminating in a step by step switching train including a connector arranged for what is known as controlled ringing. Such a switch train is provided with a four wire circuit including a tip, ring, sleeve and helping sleeve and over the latter the connector is signaled that its seizure has been effected from a toll point so that internal arrangements in the connector may be made to delay the application of ringing current to the called line until a signal for that purpose is forwarded by the distant toll operator, or automatically applied by the intertoll circuit. When the connector has thus been marked as having been seized from a toll connection it will thereupon transmit a signal back to the trunk circuit to signify the seizure of a called circuit so that the operator may at any time cause the application of ringing current thereto.

In accordance with this invention the HS circuit extending from the trunk circuit, through a selector, and into the connector is arranged in the trunk circuit to control a polar duplex circuit in the trunk to the distant toll or intertoll circuit. When the circuit is thus established through a connector, arranged also for local traffic, the fact that it has been seized in a toll or intertoll connection will result in the conditioning of such connector for delayed ringing. In a toll connection the ringing circuit in the connector is strictly under control of the toll operator and she may or may not be afforded line seizure supervision, but where the call is from an intertoll circuit it is necessary that such supervision be given in order that such intertoll circuit may respond and nullify the delayed ringing arrangements.

A feature of the invention is a circuit arrangement in the incoming termination of a circuit from toll or intertoll which will translate the seizure of a called line into a line seizure pulse transmitted back to the distant toll or intertoll circuit.

Another feature of the invention is a circuit arrangement which will respond to a line seizure signal to prepare a busy signal circuit and which in so responding will produce a momentary signal to thus relay the line seizure signal to a distant point. In accordance with this feature a line seizure signal will cause the operation of a line seized relay at the termination of said line seizure signal and which relay will thereafter control the transmission of supervisory signals. This relay is additionally provided with circuit means to control the transmission of a line seizure signal prior to its operation.

Another feature of the invention is an optional arrangement by which the said line seized relay may under a first optional wiring prevent the relaying of a line seizure signal and under a second optional wiring may cause the transmission of such a signal.

Another feature of the invention is an incoming termination circuit for a long line which acts as a relay station between such a long line and an extension thereof to relay signals between such long line and such an extension thereof built up over a switch train, and including therein means for repeating signals in two different manners in accordance with the stage of operations. Thus switch setting pulses are repeated in this circuit without alteration in timing, but after the switches have been set each pulse received and relayed is prolonged. By way of example, all pulses sent into this circuit are of a definite timing, appropriate to the working of switches and after the switches are set such incoming pulses must be of the same order to avoid release of the switches but since such subsequently transmitted pulses are for other purposes, such as ringing control, a pulse stretcher circuit for prolonging such pulses is used. In accordance with this feature the trunk termination circuit is provided with a pulse stretcher circuit and means is provided to render this effective after all the switch setting pulses have been sent and whereafter the longer pulses are required.

A feature of the invention is a pulse stretcher circuit consisting of a relay for repeating an incoming signal having an auxiliary circuit for prolonging the operation thereof. As a specific example, the incoming pulses may be measured each as a small fraction of a second whereas a single pulse of this length may be stretched to the order of two or more seconds. Again, specifically, after a switch train has been set by trains of short duration pulses, the controlled ringing circuits in the final switch may be controlled by a single short duration pulse stretched to the order of two or more seconds.

Another feature of the invention is a long line terminating in an incoming circuit and leading to a switch train and in which a duplex circuit derived from the long line is effectively extended by another duplex circuit derived from the circuitry of the switch train, the said two effectively joined duplex circuits being for signaling from end to end of the circuit during and after the said switch train has established a connection extending the said long line to a called substation, characterized in this that means is provided in the said long line termination to translate pulses incoming thereto into prolonged pulses useful for signaling purposes. In accordance with this feature each train of dial pulses incoming to said termination circuit beside being used for switch setting purposes is also translated into prolonged signaling pulses transmitted over the duplex circuit in the switch train and after the switch train has been properly set on the terminals of a called subscriber's line the circuitry within the said termination is altered so that even a signal equal to a single dial pulse is stretched or prolonged for use as a signal.

Other features will appear hereinafter.

The drawings consist of five sheets having eight figures, as follows.

Fig. 1 is a schematic circuit diagram of a toll line termination;

Fig. 2 to Fig. 5 inclusive when placed as indicated in Fig. 6, is a schematic circuit diagram of a connector circuit adapted to operate from the toll line termination of Fig. 1 and having an indication of a conventional incoming selector connected to the said termination and through which the said connector may be reached;

Fig. 6 is a block diagram placed on the same sheet with Fig. 4 showing how Figs. 1 to 5 inclusive may be placed to provide a complete circuit diagram;

Fig. 7 is a schematic circuit diagram showing the essential connections from the toll line to the termination of Fig. 1 when a simplex circuit is used to operate over a conventional polar duplex circuit, and Fig. 8 is a schematic circuit diagram which may be used in place of Fig. 7 to provide what is known as a standard E and M circuit in which the incoming and outgoing signal wires are composited on the two wires of the trunk.

DETAILED DESCRIPTION

*Seizure*

Figure 2:
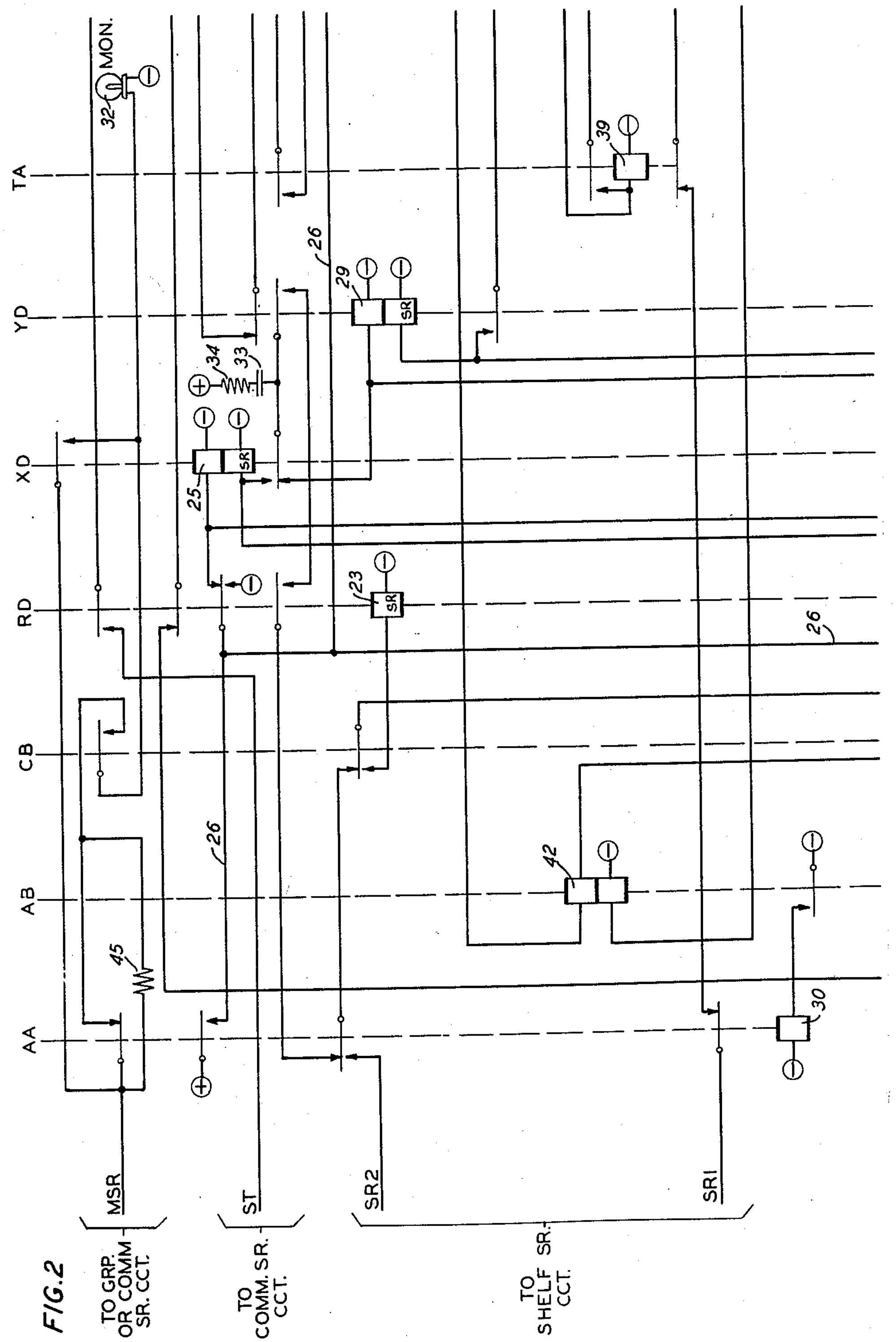

The trunk of the present invention is a one-way circuit which may be seized as an incoming circuit from a distant toll or intertoll circuit. The distant toll or the distant intertoll circuit in which this circuit terminates is conventional and consists of a two wire simplexed circuit provided with a conventional polar duplex dialing and signaling circuit. It will be understood that the polar relay 1 will respond to incoming signals from the distant toll circuit to operate the PL relay 2 over the E lead regardless of the signals transmitted over the M lead to the relay 1 and that the signals over the M lead will operate the distant polar relay regardless of the signals transmitted therefrom to operate the polar relay 1.

Upon the seizure of this circuit, a signal transmitted from the distant end will cause the operation of the polar relay 1 and this in turn will cause the operation of the pulse relay 2.

The operation of relay 2 closes a circuit for the lower winding of the SW relay 3 which operates and locks to the sleeve lead from the incoming selector over which a ground will be returned as this switch is seized, as follows.

Upon the operation of the SW relay 3 a tip and ring loop is connected to the tip and ring conductors of the incoming selector which may be traced from the tip conductor, a front contact and armature of the SW relay 3, a winding 4 of the repeating coil, the resistor 5, a winding 6 of the repeating coil, an armature and front contact of the SW relay 3, the dialing contacts 7 of the PL relay 2 to the ring conductor of the incoming selector. Thus the incoming selector is seized and this will result conventionally in the return of ground on the sleeve lead to complete the holding circuit for the SW relay 3.

The operation of the SW relay connects a resistance (upper winding of the HS relay 8) ground to the incoming selector HS lead, prepares a circuit for the slow releasing SH relay 9, prepares a circuit for the LS relay 10 and prepares another circuit for the RP relay 11. The SW relay removes ground from the all trunks busy lead ATB and connects a direct MSR ground to the MON lamp 12 to cause this lamp to burn brightly on seizure.

*Dialing*

On the first impulse of the dial at the distant toll operator's position, the polar relay 1 releases and removes ground from the E lead, opening the circuit to the PL relay 2. The PL relay restores, opening the tip and ring loop at its dialing contacts 7 and closes a circuit to the SH relay 9 which operates and remains operated through the train of pulses comprising this digit. The SH relay operates and shunts the winding 6 of the repeating coil to prevent impulse distortion during dialing and forwards battery from a front contact and armature of the SW relay 3, a back contact and armature of the LS relay 10, a front contact and armature of the SH relay 9 to a circuit which divides, one branch extending through the lower winding of the HS relay 8 to ground and another branch extending through the upper winding of the HS relay 8, and thence through a front contact and armature of the SW relay 3 to the HS lead of the incoming selector to a resistance ground therein. The two windings of the HS relay 8 are differentially wound so that this relay does not respond. The battery connection thus made during dialing to the HS leads constitutes the toll marking signal, the use of which will appear hereinafter.

Upon completion of the first impulse, the polar relay 1 reoperates applying ground to the E lead and closing the circuit to the PL relay 2. The PL relay reoperates, closing the incoming tip and ring loop thus completing the first impulse to the seized equipment. The circuit to the SH relay 9 is opened but this relay, due to its slow releasing characteristics, holds through the train of impulses.

The PL relay follows the remaining impulses, opening and closing the tip and ring loop, thus pulsing the seized equipment in accordance with the digit dialed.

At the end of this train of impulses and after an interval measured by the slow releasing characteristics of the SH relay, this relay 9 restores and changes the battery connection on the HS lead to a resistance ground connection.

The foregoing sequence of operation continues for the remaining digits necessary to establish a connection to a subscriber's line.

*Line seizure*

Upon impulsing of the connector, which will be more fully described hereinafter, via the incoming switch train, resistance battery, toll marking, forwarded on the HS lead operates the toll marking relay of the connector, which locks out the ring trip relay thereby preventing ringing current from being applied to a subscriber's line until the toll operator applies a timed ring start signal.

Upon the switch through of the connector circuit to the subscriber's line the connector will return a resistance battery signal on the HS lead, thus energizing the upper winding of the HS relay 8 and since the lower winding thereof is shunted at this time, the HS relay will respond.

The HS relay 8, in operating, opens the idle line termination circuit consisting of the condenser 14 and the resistor 13 bridged across the tip conductor leading to the coil 4 and the ring conductor leading to the coil 6. When this one-way trunk is used to terminate a line from toll, then the "V" wiring is used so that the operation of the HS relay 8 will not transmit a signal over the M conductor to the polar relay 1 so long as the LS relay 10 remains unoperated. The HS relay also introduces a resistor 15 in the circuit of the monitor lamp 12 to dim the glow thereof.

The HS relay 8 closes a circuit for the lower winding of the LS relay 10 which sufficiently energizes this relay to close its X contacts, which brings its upper winding into circuit but this is ineffective as the upper winding is shunted until the HS relay restores.

After a short interval of time the connector removes resistance battery, re-applying resistance ground to the HS lead, thus allowing the HS relay 8 to release. The HS relay restores, removing the ground shunt from the upper winding of the LS relay 10, allowing this relay to operate fully from battery through both its windings in series. The release of the HS relay shunts the resistance 15 thus bringing the monitor lamp 12 up to full brightness, connects ground directly to the M lead and completes the idle line termination (condenser 14 and resistor 13) circuit.

The full operation of the LS relay 10 prepares a circuit for the RP relay 11, prepares a resistance battery connection for the M lead and prepares a ground circuit for the HS relay 8 so that the operation of the SH relay 9 will not affect the HS relay.

It may be noted that if it is desired to give the distant toll operator line seizure supervision, then the "W" wiring may be provided so that when the called line is seized and the connector returns a resistance battery pulse over the HS conductor and causes a momentary operation of the HS relay 8, the M conductor will be momentarily connected to battery through the front contact of the HS relay 8 and a back contact of the LS relay which has operated its X contacts but which will not fully operate until the HS relay 8 has restored. This short application of battery to the M conductor will be transmitted to the distant end of the polar duplex circuit and will constitute a signal to the toll operator that the called line has been seized.

*Busy line*

If the connector of the incoming switch train connects to a busy subscriber's line, 60 i.p.m. resistance battery will be returned over the incoming switch train HS lead causing the HS relay 8 to pulse. The HS relay following the 60 i.p.m. pulses causes the connections to the polar relay 1 to alternate between battery and ground and thus cause the distant polar relay to operate to give the distant office operator flash busy supervision.

*Controlled ring*

When the toll operator wishes to ring the seized idle line, she operates her ringing key which causes a timed pulse (similar to the dialing of the digit one) to momentarily release the PL relay but which is not of long enough duration to release the connector and the switch train. The SH relay 9 is operated momentarily and this closes the circuit for the RP relay 11, which operates. During the operation of the RP relay 11, the condenser 16 is charged through the resistance 17 so that after the timed pulse from the toll operator's position and the restoration of the SH relay 9, the RP relay 11 is held operated during the discharge of this condenser 16. Thus battery current is connected through the upper winding of the HS relay 8 to the HS lead, thus reoperating the toll marking relay in the connector which brings the ring trip relay of the connector into circuit, placing the circuit for applying ringing to the subscriber's line under control of the toll marking relay.

The RP relay restores upon the discharge of the condenser 16 and reconnects resistance ground to the incoming switch train HS lead allowing the toll marking relay in the connector circuit to restore which places ringing current on the subscriber's line to signal the called party.

*Called party answers*

When the called party answers, resistance battery is returned over the incoming switch train HS lead thereby establishing an operating circuit for the HS relay 8. This relay operates and opens the idle line termination circuit (condenser 14 and resistance 13) and transfers the M lead to the winding of the polar relay 1 from ground to battery to signal the distant toll operator. The HS relay also breaks the shunt about the resistance 15 to cause the monitor lamp 12 to glow dimly during conversation.

*Recall*

If the called party wishes to re-call the toll operator, an operation of the telephone hookswitch causes a circuit in the incoming switch train to pulse the HS lead between ground and battery for pulsing the HS relay 8. This hookswitch flashing is thus relayed to the toll operator's circuit.

*Release*

When the called party disconnects, resistance ground is returned over the incoming switch train HS lead allowing the HS relay 8 to restore. This closes the idle line termination circuit, opens the original operate path to the LS relay 10, transfers the M lead from resistance battery to ground giving the distant toll operator disconnect supervision and applies a direct circuit to the monitor lamp 12 to provide a bright lamp on disconnect.

This circuit and the incoming switch train are held until the distant operator disconnects and thereby releases the PL relay 2. When PL restores, a circuit is closed for the SH relay 9, the circuit for the lower winding of the SW relay 3 is opened and the tip and ring loop through the switch train holding the calling bridge relay in the connector is opened thus allowing the switches of the train to release. The SH relay 9, closes a circuit for the RP relay 11 and opens the HS lead circuit to prevent transmission of battery thereover during the operation of the RP relay. The release of the incoming switch train removes ground from the sleeve wire thus allowing the SW relay 3 to release. The SW relay restores, opens the circuit to the RP relay 11, placing this relay under control of the discharging condenser 16, opens the holding circuit to the LS relay 10, opens the circuit for the monitor lamp 12, opens the circuit to the SH relay 9 and opens the incoming selector sleeve and HS wires. The LS relay 10 restores and in a short interval measured by its slow releasing characteristics, the SH relay 9 restores. The RP relay 11 restores upon the discharge of the condenser 16, whereby the circuit is returned to normal and is now available for other calls.

*Intertoll*

When this circuit is used to terminate a circuit reached at a distant point by an intertoll switch, from which the signal to start ringing must be sent automatically then the "W" wiring is used, that is the back contact of the LS relay 10 in the circuit of the M lead to the polar relay 1 is connected to battery instead of to ground as provided by the "V" wiring hereinbefore described.

An incoming call over the intertoll trunk causes this trunk to forward resistance battery over the incoming selector HS lead into the connector during dialing, marking the call the same as toll, which causes operation of the toll relay of the connector which in turn operates the ring trip relay therein preventing ringing current from being applied to the subscriber's line immediately upon switch through of the connector circuit. Upon completion of dialing, this trunk reconnects resistance ground to the HS lead. The connector circuit switching through to an idle line, causes resistance battery to be returned momentarily over the HS lead thus producing a momentary operation of the HS relay 8. The HS relay in operating closes a circuit to the lower winding of the LS relay 10 which operates its X contacts. During this momentary operation of the HS relay the M lead to the winding of the polar relay 1 is switched to battery and thus a short line seizure pulse is transmitted into the intertoll circuit.

The connector returns the incoming HS lead to resistance ground and the HS relay 8 restores. The LS relay 10 thereupon fully operates and connects the RP relay 11 under control of the SH relay 9 so that when the ring pulse from the intertoll trunk is received, the RP relay 11 will respond.

The intertoll trunk responds to the line seizure pulse and thereupon automatically applies the ring pulse causing a short break (as though the digit one had been dialed) in the circuit of the PL relay 2. The PL relay restores momentarily and closes a circuit to the SH relay 9. The SH relay operates and causes the operation of the RP relay which after the release of the slow releasing SH relay applies resistance battery to the incoming HS lead over an interval measured by the discharge of the condenser 16. This reoperates the toll marking relay in the connector which in turn restores the ring trip relay therein preparing the circuit for applying ringing current to the subscriber's line. Thus the conditions for controlled ringing set up in the connector as in a call from toll are automatically nullified on an intertoll call and the called subscriber is rung automatically.

*The incoming selector*

Figure 3:
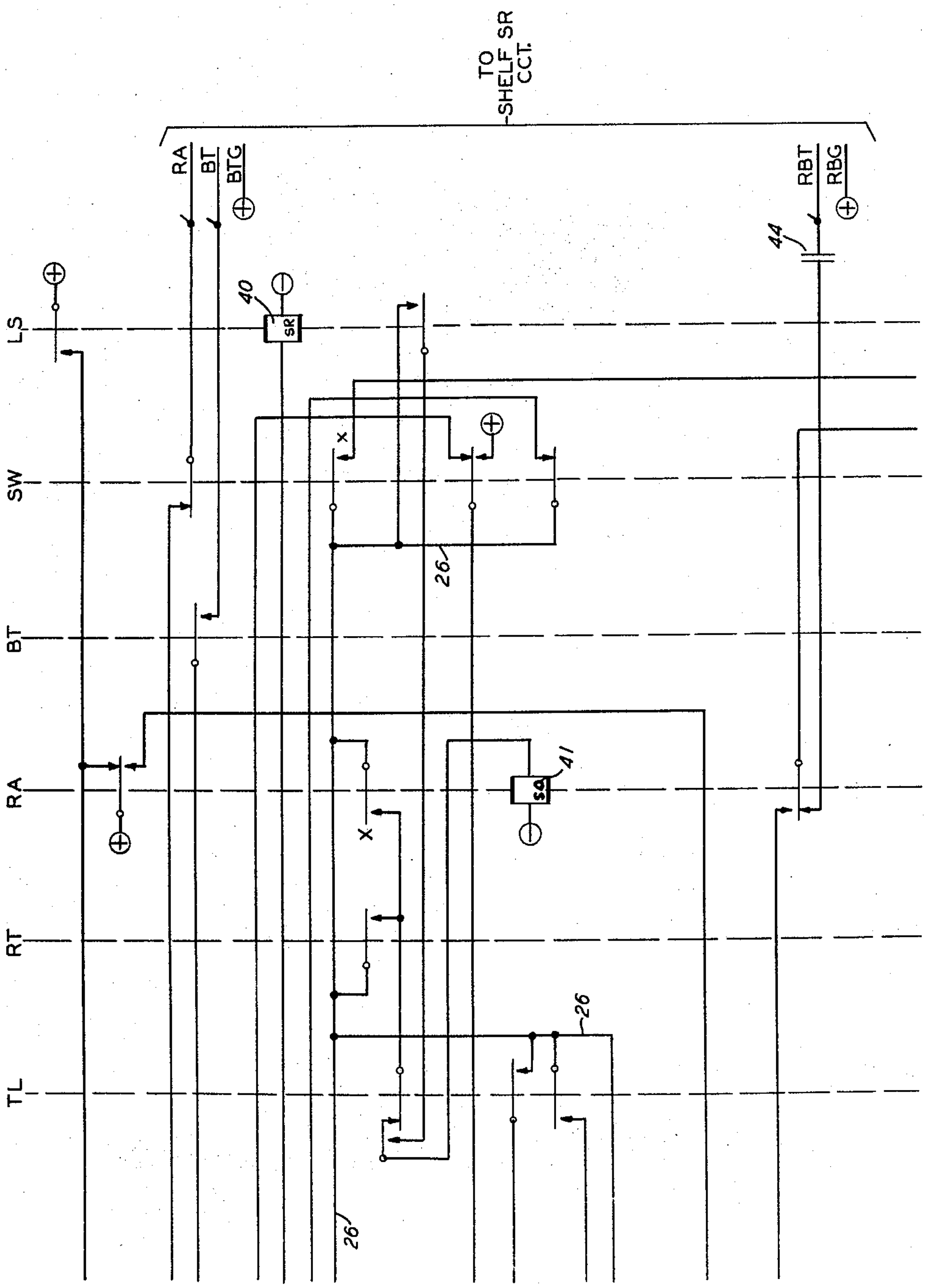
Figures 4, 6:
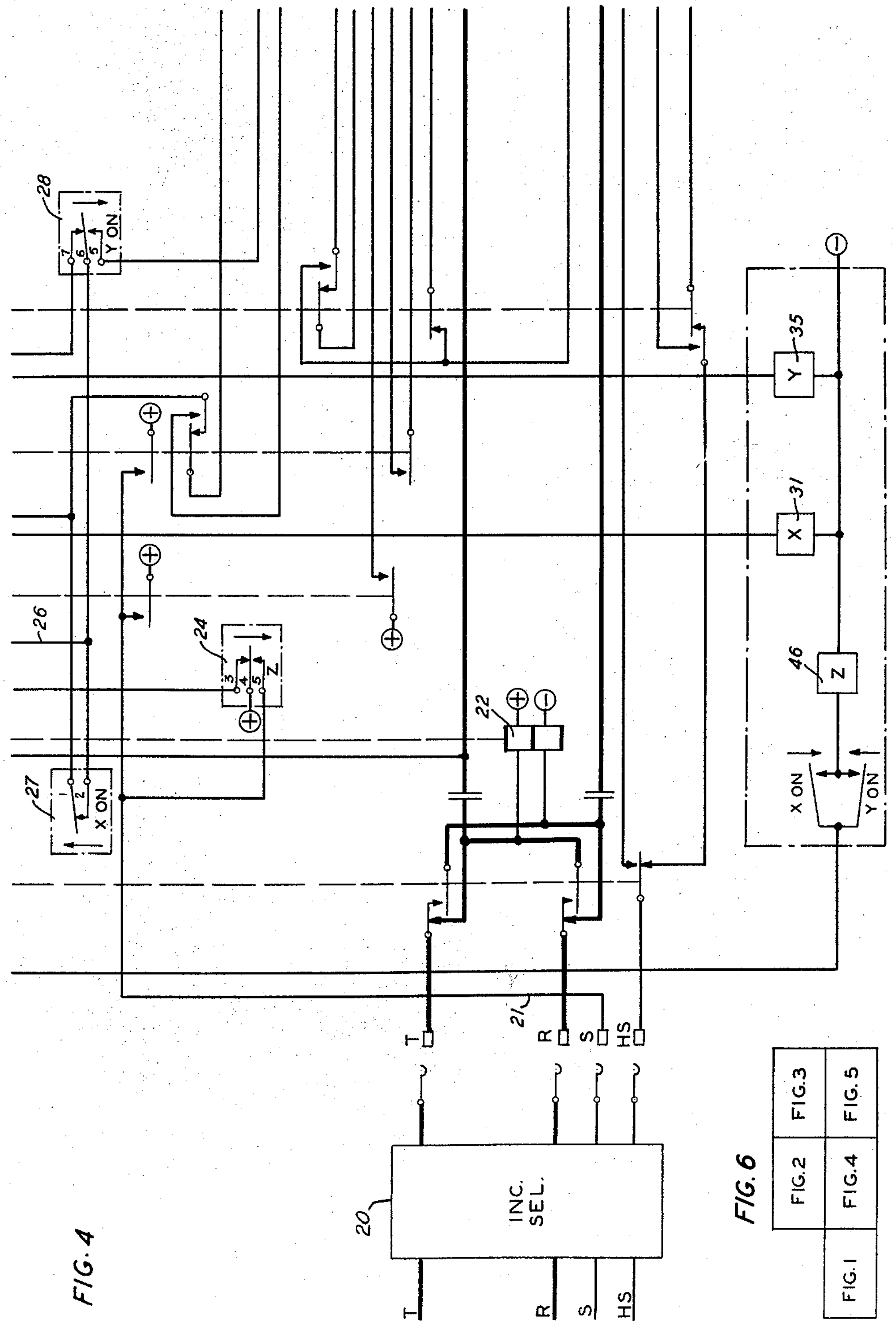
Figure 5:
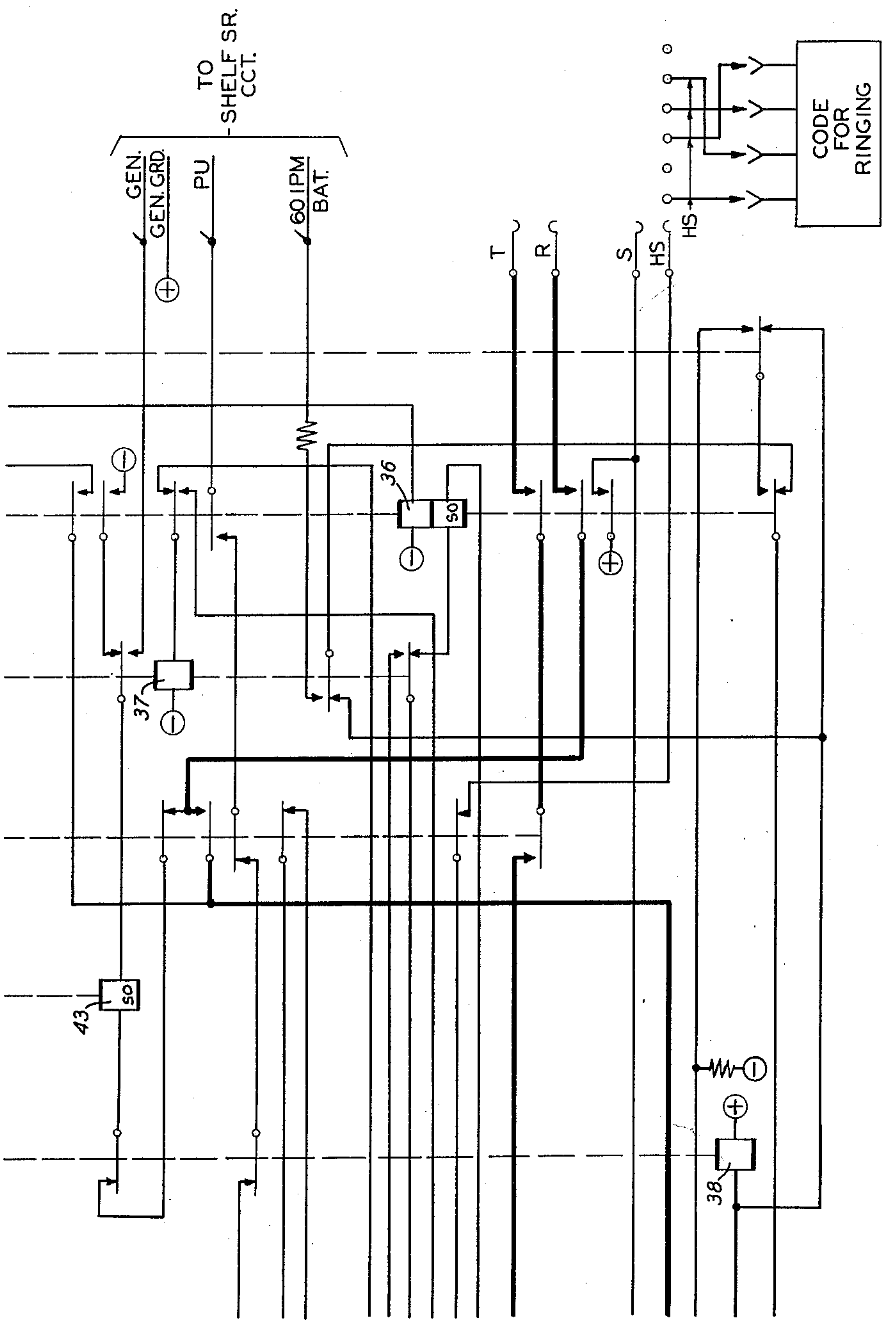

The incoming selector 20 is conventional. When it has been set, the four wires T, R, S and HS will be afforded a clear path therethrough from the toll line termination of Fig. 1 to the connector of Figs. 2 to 5 inclusive, with the exception of the sleeve wire S which will additionally be used to maintain the switch through relay therein operated. At the termination of the use of this circuit, ground will be removed from the sleeve within the connector circuit and the switch will be restored to normal.

THE CONNECTOR

*Seizure*

When the incoming selector has found an idle connector and has brought its wipers to rest on the connector terminals in its bank and operated its switch through relay, this connector will have been seized. Ground will temporarily be placed on the sleeve wire 21 by the selector to hold the connector from seizure elsewhere until the connector itself connects a ground thereto. The tip and ring loop provided in the termination circuit of Fig. 1 will cause the conventional operation of the calling bridge CB relay 22 and this relay will cause the immediate operation of the release delay RD relay 23. The circuit for the RD relay 23 may be traced from ground through the release magnet contacts 24, an armature and front contact of the CB relay 22 and the winding of this slow release RD relay 23 to battery. It may be noted that the RD relay will remain operated hereafter until the distant toll operator abandons the connection and causes the release of the pulse relay 2.

Upon the operation of the RD relay 23 ground is connected thereby to the sleeve wire 21 and hence the connector is maintained marked as busy thereafter until released. It will appear hereinafter that the XD relay 25 will also connect a ground to the sleeve and that this ground becomes useful when the last party release "W" wiring is provided and when the called party is the last to release.

The RD relay 23 also places a ground on the master ground wire 26 which will afford a source of ground potential for operating and locking purposes hereafter until complete release.

Ground placed on this master ground conductor 26 will be extended through the XON contacts 27 to the upper winding of the XD relay 25 and through the YON contacts 28 to the lower winding of the YD relay 29 thus providing the initial energization of these pulsing delay relays. The connector is now ready to be stepped. The seizure of the connector and the operation of the CB relay and the XD relay causes the monitor lamp 32 to burn brightly as a signal to the maintenance personnel that this switch has been seized for use.

*Dialing the 1st digit*

As the loop controlling the CB relay 22 is opened on the first pulse of the first digit, ground is extended from the release magnet interrupter springs 24, armature and back contact of the CB relay, armature and back contact of the AA relay 30, armature and front contact of the RD relay 23, front contact and armature of the YD relay 29, armature and front contact of the XD relay 25 and thence in parallel through the lower winding of the XD relay 25 to battery and through the winding of the X magnet 31 to battery. Since the energization of the X magnet causes the switch to step and thus operates the X off normal points, this connection of the lower winding of the XD relay in parallel with the X magnet will maintain the XD relay operated throughout the first digit. The spark suppressor circuit consisting of the condenser 33 and the resistor 34 is now bridged across the above described parallel stepping circuit.

At the end of this first pulse the CB relay reoperates and again closes a circuit for the RD relay which due to its slow releasing characteristics had remained operated during this first pulse. At this time the parallel stepping circuit is opened so that the X magnet 31 releases but the XD relay 25, due to its slow releasing characteristics, remains operated.

Thereafter these conditions are maintained, that is the X stepping magnet is operated to advance the switch one step in the X direction for each release of the CB relay 22 and the RD and the XD relays are maintained operated during the transmission of this train of pulses representing the first digit. At the end of this train the CB relay 22 will remain operated and the XD relay, after an interval measured by its slow releasing characteristics will release. Thereupon the stepping circuit is transferred by the XD relay 25 to a similar circuit extending in parallel through the upper winding of the YD relay 29 and the winding of the Y magnet 35.

*Toll marking*

It should be noted at this time that this connector is provided for both local and toll service and that the difference in the service for which it has been seized is made manifest by the toll marking signal received over the HS conductor during the dialing of each digit. Thus during the dialing of the first digit above described, the normal connection of resistance ground to the HS conductor is changed to a resistance battery connection and this may now be traced through an armature and front contact of the YD relay 29 to the lower winding of the TL relay 38 to ground. The TL relay thus operates during the dialing of the first digit and will release when this has been completed. However, the operation of the TL relay 38 connects the master ground wire to the TA relay 39 and this relay then locks itself to this master ground. The TA relay 39 in turn closes a circuit from the winding of the LS relay 40 through a back contact of the SW relay 36 to the master ground so that the LS relay will operate and remain operated until the called line is seized as will appear hereinafter.

Since the TA relay 39 and the LS relay 40 operate immediately on the operation of the TL relay 38, a circuit from the master ground will be extended through an armature and front contact of the LS relay 40, a front contact pair of the TL relay to the winding of the slow operate RA relay 41 so that this relay operates its X contacts to assure itself a locking circuit when the TL relay releases. The RA relay 41 opens the connection of the ring trip RT relay 43 to the ring conductor leading to the ring brush of the connector.

It may be noted that if this connector had been seized for local service that no battery connection during dialing would have been made to the HS conductor and that therefore neither the TL relay 38, the TA relay 39, the RA relay 41, nor the LS relay 40 would have been operated as described and that the ring trip relay would have been left in its normal connection to the outgoing ring conductor so as to afford an immediate ringing connection upon the seizure of the called line and the operation of the switch through relay 36.

*Dialing the second digit*

The operations during the dialing of the second digit are much the same as above described with the exception that at this time the Y magnet 35 will be operated and the YD relay 29 will act to hold until this digit has been completed. After the switch wipers have been placed on the terminals of the called line and while the YD relay 29 is still operated, the busy test will be made. The circuit for this test is from battery, the winding of the BT relay 37, an armature and back contact of the SW relay 36, closed contacts of the YD relay 29 to the sleeve wiper of the connector. If the called line is idle, battery potential will be found on the sleeve of the called line and the BT relay will not respond. If the called line is busy, ground will be found on the sleeve terminal and the BT relay will respond.

*Called line busy*

If the called line is busy, then the BT relay 37 operates and opens the operating circuit for the SW relay 36. The BT relay 37 connects a source of busy tone through a front contact and armature of the BT relay, a back contact and armature of the YD relay 29, a back contact and armature of the SW relay 36, and thence through the upper winding of the answering bridge AB relay 42 whereby busy tone is transmitted back over the talking conductors to the calling party. At the same time the 60 i.p.m. source is connected through a front contact and armature of the BT relay 37, a back contact and armature of the SW relay 36, normal contacts of the YD relay 29 to the HS conductor leading back through the incoming selector where it operates the HS relay in the toll line termination as hereinbefore described to return this flash supervisory signal to the distant toll operator.

*Called line idle*

If the called line is idle, the BT relay 37 does not operate, so that upon the release of the YD relay 29 a circuit is completed from an armature and front contact of the RD relay 23, an armature and back contact of the BT relay 37, lower winding of the SW relay 36, an armature and back contact of the YD relay 29 to the sleeve of the called line where battery potential will be found and because of which the SW relay 36 will operate its X contacts to connect its upper winding to the master ground wire 26 to cause the complete operation thereof.

In a connection extended from toll, where the TA relay 39, the RA relay 41 and the LS relay 40 have been operated as hereinbefore described, the circuit of the LS relay will be opened by the operation of the SW relay. The LS relay, however, is slow to release so that there will be a short period after the SW relay has become operated during which the LS relay is also operated whereby resistance battery will be extended over a front contact and armature of the LS relay 40, a front contact and armature of the SW relay 36, normal contacts of the YD relay 29, a back contact and armature of the AB relay 42 to the HS conductor leading back to the toll line termination, Fig. 1. This short application of battery to the HS conductor constitutes the line seizure signal and since the RA relay 41 is now operated ringing current will not be applied to the called line until a ringing signal is transmitted from toll. However, the AB relay 42 is connected to the outgoing tip and ring wipers so that if the called party, unaware that a connection has been established to his line tries to make a call he will cause the operation of his AB relay 42 and its slave AA relay 30 and since the AB relay causes reverse current supervision the calling toll operator will be signaled.

Had the call come from an intertoll connection this line seizure signal would trigger a circuit which would immediately and automatically send out a ringing signal and this, as hereinbefore explained, would transmit a stretched battery pulse to the HS conductor which would thereupon operate the TL relay 38. As a result of this the RA relay 41 will be released, the LS relay 40 now being restored, so that the RT relay 43 (on the release of the TL relay) is connected to the outgoing ring wiper of the connector. Until the ringing code has been arranged, the RT relay 43 is connected to battery at a back contact of the SW relay 36 and the tip wiper of the switch is connected to ground at a back contact of the RA relay 41 whereby should the called party answer prematurely, he will cause the operation of the RT relay 43 and come in on the connection in the conventional manner.

Each separate called subscriber's line may be marked in his line circuit or in a special marking block so that the individual HS conductor has applied to it a particular code marking, somewhat in the manner set forth in the application of George Elliott, Serial Number 432,755, filed May 27, 1954, now Patent Number 2,782,260. Upon the release of the RA relay 41, the pick up lead is connected through an armature and front contact of the SW relay 36, an armature and back contact of the RA relay 41, an armature and back contact of the TL relay 38, the normal contacts of the XD relay 25 and thence to the upper winding of this latter relay, whereby it operates and locks in a circuit through a back contact and armature of the RA relay 41, the operated YON contacts 28 to the master ground wire 26. Thereafter and in proper timed relation to the pick up pulse, a coded train of pulses will be transmitted over the outgoing HS conductor, a back contact and armature of the RA relay 41, an armature and front contact of the XD relay 25, a front contact and armature of the SW relay 36 to the winding of the BT relay 37 and thence to battery. The BT relay will operate in code, proper for the particular called station, and on each said coded operation will transfer the connection of the RT relay 43 from battery to ringing generator. Ringback tone will be transmitted through the condenser 44, a back contact and armature of the RA relay 41, a front contact and armature of the SW relay 36, ring of the talking conductors leading back to the toll line whereby the toll operator or a subscriber who has established an intertoll connection will be notified that the called party is being rung.

When the connection has been established from a toll operator's position, the ringing signal is returned as described, not immediately and automatically but at the will of the operator and hence may be delayed.

*Called party answers*

When the called party answers, the RT relay 43 will respond either during a ringing period by the increase in ringing current therein or during a silent period by the increase of battery current therein. The operation of the RT relay 43 closes a circuit for the RA relay 41 and this relay operates and locks through its X contacts to the master ground wire 26. The RA relay 41 closes the talking conductors through to the tip and ring wipers of the switch. The AB relay 42 is operated under control of the called subscriber's loop. A circuit from ground, a front contact and armature of the SW relay 36 extends through the upper winding of the AB relay 42 to the outgoing tip wire and a circuit from battery extends through the lower winding of the AB relay 42, a front contact and armature of the RA relay 41, and a front contact and armature of the SW relay 36 to the outgoing ring wire. The AB relay reverses the battery connection toward the calling subscriber to provide the conventional reverse battery supervision. The AB relay also switches the incoming HS conductor from its ground connection to a battery connection to provide the HS called party supervision to the toll operator's position.

The AA slave relay 30, opens a shunt about the resistance 45, so that upon the release of the XD relay 25, the monitor lamp 32 will glow dimly as an indication to maintenance personnel that the associated apparatus is in use.

Upon the operation of the RA relay 41 resulting from the operation of the RT relay 43, the circuit for the XD relay is opened and this relay releases.

*Release*

With the optional "W" wiring hereinbefore mentioned, the release is under the joint control of both calling and called parties, specifically under control of both the calling bridge CB relay 22 and the answering bridge AB relay 42. The release of the CB relay 22 releases the RD relay 23 whereby one ground is removed from the master ground wire 26 and the release of the AB relay releases the AA slave relay whereby the remaining ground is disconnected from the master ground wire 26.

All relays such as the RA relay 41, the TA relay 39 and the SW relay 36 depending on this ground will release.

If the calling party, or the toll operator, releases first, the RD relay 23 will release to remove one ground from the incoming sleeve wire whereby the incoming selector through which this connector had been seized will be released. However, when the RD relay 23 reaches its back contacts, the XD relay will be operated by the master ground and a ground will again be placed on the incoming sleeve wire to mark the connector as busy until the called party releases. The incoming selector is thus dropped off during the travel of an armature of the RD relay 23 from its front to its back contact.

If the called party releases first, the XD relay will not be operated.

When both parties have released and the SW relay 36 restores, the RA ground will be extended through an armature and back contact of the RD relay 23, the XON and YON contacts to the winding of the Z release magnet 46, whereby the wipers of the switch are returned to normal. During the operation of the Z magnet and until the XON and YON springs are fully restored to normal, the springs 24 of the release magnet will operate to place a guarding ground on the incoming sleeve. When the Z magnet 46 restores, the switch is completely restored and is in a condition for use in some other connection.

What is claimed is:

1. In a telephone system, a long time terminating in an incoming circuit in turn terminating in an incoming selector, means in said long line termination for relaying switch setting pulses to said incoming selector and through said incoming selector to other switches reached thereby, means in said termination circuit for relaying supervisory signals from said switches back over said long line, said last means being responsive initially to a switch transmitted signal representing the seizure of a called line and a pulse stretcher circuit responsive thereto for prolonging subsequent pulses transmitted over said long line to be relayed to said switches.

2. In a telephone system, a long line terminating in an incoming circuit in turn terminating in an incoming selector, other switches accessible to said incoming selector for further extending said long line to a called subscriber's line, a pulse relay in said termination responsive to pulses incoming over said line, a switching relay responsive to said pulse relay and means under control of said pulse relay and its associated switching relay for setting and holding said incoming switch and others of said switches accessible thereto, means in said termination responsive to supervisory signals transmitted by said other switches for relaying said supervisory signals back over said line, a pulse stretcher circuit in said termination for prolonging the duration of pulses transmitted over said line to said pulse relay, a separate circuit from said termination to said incoming switch extendible thereby to said other switches accessible thereto for transmitting said stretched pulses to said other switches, and means responsive to a said supervisory signal for rendering said pulse stretcher circuit responsive to said pulse relay.

3. In a telephone system, a one-way trunk circuit consisting of a two wire circuit from a distant point an incoming trunk termination and a four wire incoming selector connected to said termination, other switches accessible to said incoming selector for further extending said trunk to a called subscriber's line, a pulse relay and an associated switching relay in said termination responsive to pulses transmitted over said two wire trunk for setting and holding said incoming selector and others of said switches reached thereby, said four wires from said termination to said incoming selector comprising a tip and ring for a talking circuit, a sleeve for testing and holding and a helping sleeve for transmitting supervisory signals including a signal from one of said other switches denoting the seizure of a called subscriber's line, said pulse relay operating to transmit switch setting pulses over said tip and ring circuit, means in said other switches reached over said incoming selector for transmitting supervisory signals to said termination and means in said termination for relaying said supervisory signals over said two wire trunk, a pulse stretcher in said termination for translating a pulse transmitted over said two wire trunk into a prolonged signal over said helping sleeve wire and means responsive to a first supervisory signal for enabling said pulse stretcher circuit.

4. In a telephone system, a one-way trunk circuit consisting of a two wire circuit from a distant point, an incoming trunk termination and a four wire incoming selector connected to said termination, other switches accessible to said incoming selector for further extending said trunk to a called subscriber's line, a pulse relay and an associated switching relay in said termination responsive to pulses transmitted over said two wire trunk for setting and holding said incoming selector and others of said switches reached thereby, said four wires from said termination to said incoming selector comprising a tip and ring for a talking circuit, a sleeve for testing and holding and a helping sleeve for transmitting supervisory signals including a signal from one of said other switches denoting the seizure of a called subscriber's line, said pulse relay operating to transmit switch setting pulses over said tip and ring circuit, means in said other switches reached over said incoming selector for transmitting supervisory signals to said termination and means in said termination for relaying said supervisory signals over said two wire trunk, a pulse stretcher in said termination for translating a pulse transmitted over said two wire trunk into a prolonged signal over said helping sleeve wire and means responsive to a first supervisory signal for enabling said pulse stretcher circuit and an optional wiring arrangement for translating said first supervisory signal into a pulse transmitted back over said two wire circuit or, alternatively, into no pulse transmitted back over said two wire circuit.

5. In a telephone system, a toll trunk from a distant point having a termination leading to an incoming selector, other switches including connectors accessible to said incoming selector, a pulse relay and an associated switching relay in said termination responsive to dial pulses and supervisory signals of the same order as dial pulses transmitted over said toll trunk, a supervisory signal relay in said termination responsive to signals transmitted from said connectors over said incoming selector toward said toll trunk, a line seizure relay in said termination, means responsive to an initial operation of said supervisory signal relay for preparing said line seizure relay for operation, means jointly controlled by said supervisory signal relay and said line seizure relay for transmitting a signal pulse, indicative of the seizure of a line by a said connector, to said toll trunk, and means thereafter effective under steadily continued control of said line seizure relay for transmitting supervisory signals to said toll trunk.

6. In a telephone system, a toll trunk from a distant point having a termination leading to an incoming selector, other switches including connectors accessible to said incoming selector, a pulse relay and an associated slow releasing relay, a switching relay in said termination responsive to dial pulses and supervisory signals of the same order as dial pulses transmitted over said toll trunk, a supervisory signal relay in said termination responsive to signals transmitted over said incoming selector toward said toll trunk, a line seizure relay in said termination, means responsive to an initial operation of said supervisory signal relay for preparing said line seizure relay for operation, means jointly controlled by said supervisory signal relay and said line seizure relay for transmitting a signal pulse, indicative of the seizure of a line by a said connector, to said toll trunk, means thereafter effective under steadily continued control of said line seizure relay for transmitting supervisory signals to said toll trunk and a pulse stretching relay responsive to said pulse relay and said slow releasing relay under control of said line seizure relay for transmitting a prolonged signal over said incoming switch circuit.

7. In a telephone system, a long line terminating in an incoming circuit, said incoming circuit terminating in an incoming selector, other switches accessible to said incoming selector for extending said long line to a distant called subscriber's station, a duplex signaling circuit derived from said long line and terminating in said long line termination, a second duplex circuit extending from said termination over said switches, said two duplex circuits being effectively joined into a single signaling circuit in said long line termination, and means provided in said termination circuit for translating trains of signals of dial pulse length incoming over said long line duplex circuit into prolonged signal pulses outgoing over said switch train duplex circuit and means in said long line termination responsive to the first reverse direction signal transmitted over said switch train duplex circuit toward said long line duplex circuit for enabling a pulse stretching circuit, and a pulse stretching circuit in said long line termination for stretching pulses subsequently transmitted over said long line duplex circuit for further transmission over said switch train duplex circuit.

8. In a telephone system, a signal circuit consisting of a first duplex circuit and a second duplex circuit connected in cascade by a control circuit, means in said control circuit for translating trains of signals from said first duplex circuit into single signals per train of signals transmitted over said second duplex circuit, means in said control circuit responsive to an initial signal transmitted back over said second duplex circuit for transmission into said first duplex circuit and means controlled by said responsive circuit for stretching signals subsequently transmitted over said first duplex circuit for transmission into said second duplex circuit.

References Cited in the file of this patent

UNITED STATES PATENTS

| | | |
|---|---|---|
| 1,381,195 | Ide | June 14, 1921 |
| 1,709,084 | MacDougall | Apr. 16, 1929 |
| 2,654,001 | Lomax | Sept. 29, 1953 |
| 2,707,728 | Elliott | May 3, 1955 |
| 2,715,159 | Phari | Aug. 9, 1955 |
| 2,814,674 | Stallworthy et al. | Nov. 26, 1957 |